Oct. 9, 1951

E. E. FOBES ET AL 2,570,933

TRAILER HITCH

Filed March 5, 1948

Inventors
Ernest E. Fobes
Ralph P. Rutter

By *Clarence A. O'Brien
and Harvey B. Jacobson*
Attorneys

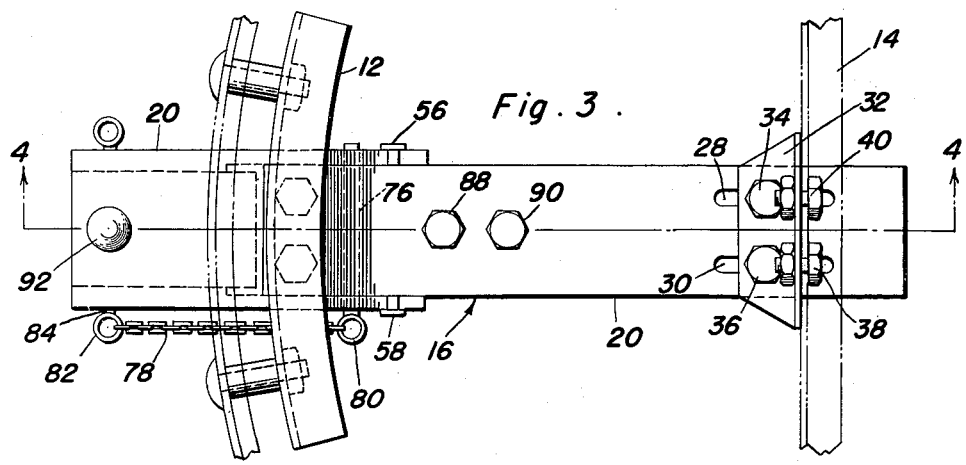
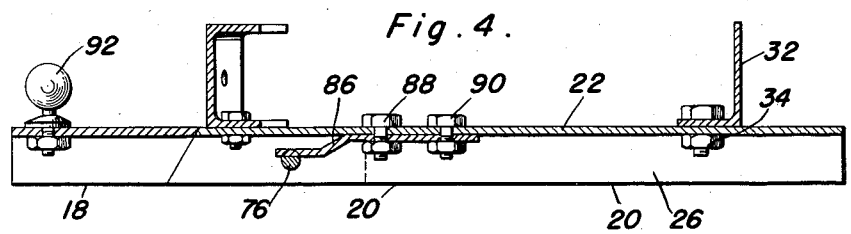
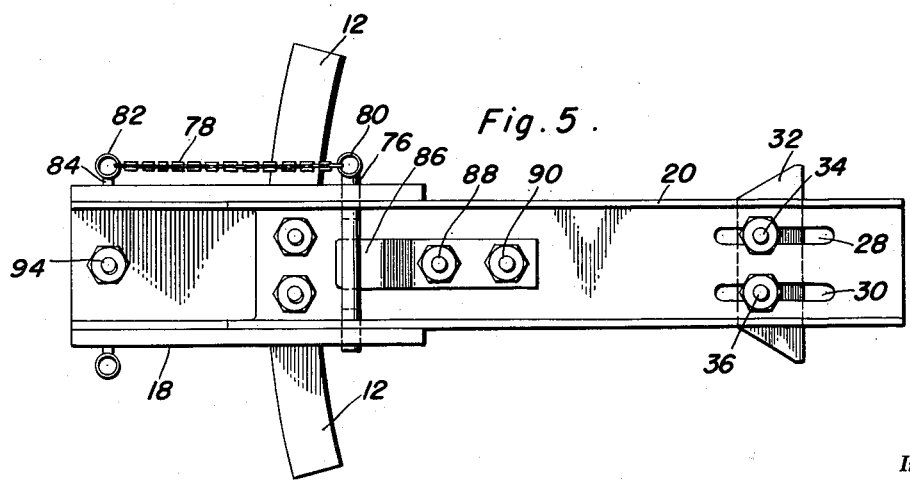

Patented Oct. 9, 1951

2,570,933

UNITED STATES PATENT OFFICE 2,570,933

TRAILER HITCH

Ernest E. Fobes, West Middlesex, and
Ralph P. Rutter, Greenville, Pa.

Application March 5, 1948, Serial No. 13,296

5 Claims. (Cl. 280—33.44)

1

This invention relates to improvements in vehicle hitches, which are utilized for facilitating attachment of a draft vehicle, such as, a house trailer or van trailer, to a motor driven vehicle and has for its principal object to enable such a draft vehicle or a similar trailer to be moved conveniently, securely and easily connected or disconnected from a motor vehicle with relatively little manual exertion and with a minimum of time spent.

Another object of this invention is to provide a trailer hitch assembly that is designed and constructed for attachment to any type of motor vehicle whereby a trailer may be safely and securely connected thereto.

Another object of this invention is to enable a trailer to be conveniently attached or detached from a pulling vehicle without the utilization of any tool, such as a wrench or the like.

Another object of this invention is to provide a trailer hitch assembly that is permanently secured to a vehicle and which when not in use is concealed in an invisible position so as not to destroy or mar the finished appearance of the vehicle.

Another object of this invention is to attach a trailer to a motor vehicle frame so that the load is carried directly to the frame and the pull induced by the draft vehicle does not deform or bend the bumper but is borne by the strong integral frame.

A meritorious feature of this invention is the provision of a sectional trailer hitch assembly, one of sections being permanently secured under the vehicle to the frame, so that it does not extend beyond the bumper and mar the appearance of the car or present a dangerous projection; the other section being easily and conveniently connected to the permanently attached section, when it is desired to attach a trailer to the motor vehicle, and quickly disconnected without the employment of any forcing means.

Another object of this invention to be specifically herein enumerated is to provide a hitch assembly for connecting a draft vehicle to a motor vehicle which is economical to manufacture and is highly efficient, reliable and durable in use.

These and ancillary objects and other meritorious features of this invention are attained by this invention, a preferred embodiment of which is set forth in the following description and illustrated in the accompanying illustrative drawings, wherein:

Figure 1 is a fragmentary elevational view of

2 a vehicle bumper and frame assemblage exemplifying a hitch assembly, constructed in accordance with this invention, connected thereto;

Figure 3 is a plan view of the improved trailer hitch showing the hitch connected to the bumper and frame of a motor vehicle.

Figure 4 is a longitudinal vertical cross-sectional view taken substantially on the longitudinal plane of line 4—4 of Figure 3, and;

Figure 5 is a bottom plan view of the trailer hitch showing same in attachment with vehicle components.

Figure 1:
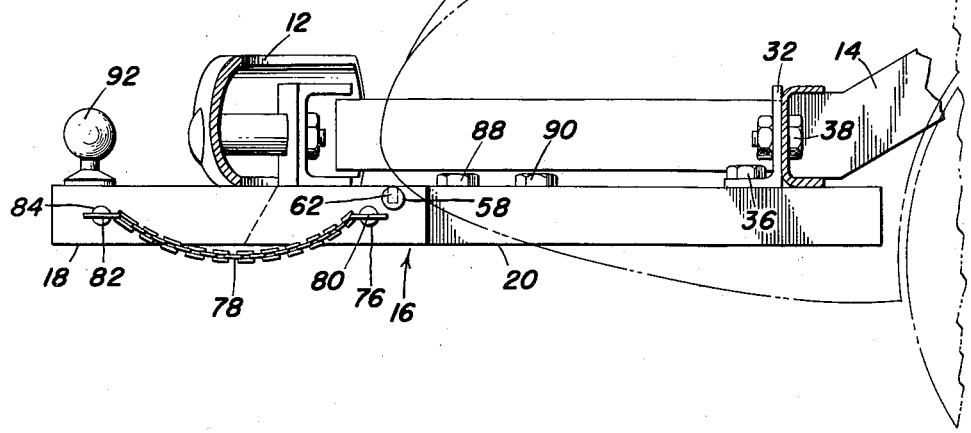
Figure 2:
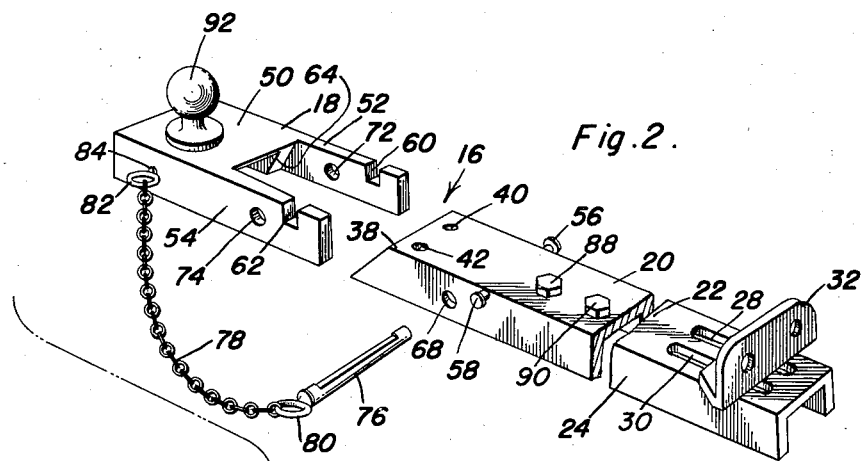
Figure 2 is a structural view in perspective of this invention.

Referring now particularly to the drawings, wherein a preferred embodiment of this invention is illustrated in association with a passenger vehicle by way of example only and wherein similar characters of reference designate corresponding parts throughout, 10 designates a fragmentary portion of a motor vehicle of customary model and style, having the conventional contiguous components, including a bumper 12, extending crosswise of the vehicle and suitably projected therefrom and a cross frame 14, the components being of various sizes and shapes dependent on the type or make of automobile.

The improved hitch assembly 16 is especially designed and adapted for attachment to the frame 14 and comprises in general, sectional channel bars 18 and 20. Channel bar 20 is substantially U-shaped in cross-section and has a longitudinally extending top face 22 with depending opposed sides 24 and 26. Suitably constructed and arranged adjacent one end of the bar 20 and disposed in spaced proximity on the face section 22 thereof are a pair of elongated angular slots 28 and 30, longitudinally extending on the top section or face 22. An angle iron 32 having perforated angular sections is seated on the face or top section 22 and conventional means, such as bolts 34 and 36, are employed to adjustably secure one section of the angle iron to the channel bar. The upraised section of the angle iron is suitably apertured and bolts and nuts 38 and 40 are inserted therethrough, thereby securing the angle iron to the frame 14. It is thus apparent that the section 20 of the divided channel bar is adjustable relative to the frame 14, due to the provision of the elongated slots 28 and 30, so that the bar 20 may be entirely disposed under the vehicle 10, regardless of the make or style of the vehicle 10.

The sides 24 and 26 are bevelled at one end, forming a tapered, or bevelled end 38, for a purpose to be later described. Disposed on the top face 22 adjacent the bevelled end 38 are a pair of medially spaced apertures 40 and 42, through which bolts and nuts 44 and 46 are inserted, thus securing the bar to the bumper 12, so that the bar 20 is rigidified at its extended bevelled end 38.

Thus, the channel bar 20 is permanently secured to the frame and bumper of the car but does not project or extend beyond the bumper thereof to mar the appearance of the car or tend to cause accidents resultant from extended projections.

When it is desired to connect a draft vehicle or trailer (not shown) to the motor vehicle 10, the channel bar section 18 is connected to the section 20 forming the unitary hitch assembly 16. The channel bar section 18 comprises a body section 50, having oppositely depending sides, which extend or project forwardly forming parallel arms 52 and 54 which are adapted to engage the outer surface of the opposed sides 24 and 26 of the channel bar section 20. Oppositely disposed on the sides 24 and 26 of channel sections 22 and projecting laterally therefrom are lugs 56 and 58, which are seated in aligned angular or rectangular peripheral notches 60 and 62 formed in the top edge of the parallel arm extensions 52 and 54, when the arm extensions are placed in engagement with the sides 24 and 26 of the channel section 22. The channel section 18 has a complementary slanted portion 64, at the juncture of the parallel projecting arms 52 and 54, which abuts against and engages flush with the bevelled end 38 of the channel sections 20, when the bars 18 and 20 are moved into hitch or operative engagement.

Suitable means are provided to secure or lock the detachable channel sections 18 and 20 in complementary engagement forming the unitary hitch bar or assembly 16 and include aligned openings 68 and 70 formed in the opposed sides 24 and 26 of the channel section 22 and aligned oppositely disposed apertures or perforations 72 and 74 formed in the arms 52 and 54, which are horizontally aligned, when the section 18 engages the section 20. A bar or locking pin 76 is provided and is inserted in the aligned openings. The locking pin 76 is secured to the side of the channel section 18 by means of a chain 78, having one end secured to an annular ring or head 80 formed on the locking pin and the other end secured to a ring 82, suitably secured to the side of the channel section 18 by means of a rod or bar 84 inserted transversely therethrough.

Suitably secured to the underside of the face section 22 of the channel section 20 is a spring clamp 86, comprising a resilient steel or metallic plate having one end offset and the other bolted to the face section 22 by bolts and nuts 88 and 90. The offset section of the spring clamp 86 serves to retain the locking pin 76 inserted in the aligned openings.

Seated on the extended end of the channel section 18 is a coupling ball member 92, which is provided with a locking bolt and nut 94 which serve to secure the coupling ball to the channel section, whereby a draw-bar or a similar trailer connecting members is detachably secured to the hitch assembly.

In operation, the channel section 20 is permanently secured to a vehicle and is adjustable relative to the various and diversified models of automobiles. When it is desired to draft a trailer, the complementary channel section 18 is secured to the channel section 20 by sliding the arms 52 and 54 along the sides 24 and 26, until the notches 60 and 62 receive the projected lugs 56 and 58. Then, the pin 76 is inserted through the aligned openings 68, 70, 72 and 74, locking the sections together. A draw-bar connected to the trailer is then secured to the ball and joint coupling 92.

It is thus apparent that there has been provided a novel, efficient and durable hitch assembly, whereby a draft vehicle may be easily, conveniently and detachably secured to a motor vehicle.

Since many other purposes and modifications will become apparent to those skilled in the art upon a perusal of the foregoing description in view of the accompanying drawings it is to be understood that certain changes in style, structure and arrangement of parts may be effected without a departure from the spirit of the invention and within the scope of the appended claims.

Having described the invention, what is claimed as new is:

1. In a trailer hitch, a coupling including a first section and a second section, means for securing said first section to the frame of a vehicle for longitudinal adjustment with respect to the frame, an extending bevelled end on said first section, a complementary end on said second section for engagement thereagainst, opposed parallel arms on said end of the second section, said arms being slidably engageable on the opposed sides of the first section, notches formed on the upper edges of said arms, lateral lugs carried by the sides of the first section and adapted to seat in said notches, said arms being provided with transversely aligned openings, said first section having transversely aligned apertures registerable with said openings when the lugs are seated in the notches in the arms, a locking pin carried by one of said sections slidably disposed in said registered apertures and openings, means for frictionally retaining said pin in the apertures and openings, and means for coupling said second section to a trailer.

2. The combination of claim 1, wherein said frictional retaining means includes a resilient plate carried by the under side of one of the sections and having a free end disposed in the transverse path of the pin and adapted to embrace the shank of the pin.

3. The combination of claim 1, wherein a flexible connecting member is secured to one end of the locking pin and permanently connects the same to one of the sections.

4. A trailer coupling device comprising a first section and a second section, means for securing said first section to the frame of a vehicle for longitudinal adjustment with respect to the frame, opposed bevelled faces on said first and second sections, parallel arms extending from the edges of the bevelled face of one of said sections adapted to be slidably engageable with the sides extending from the face of the other of said sections, aligned apertures in said arms and in said other section, and a removable locking pin extending through said apertures for connecting said first and second sections, notches in the said arms, laterally extending lugs mounted on the sides of said other section adapted to be engageable in said notches, and means on said second section for coupling said second section to a trailer.

5. A trailer coupling device comprising a first section and a second section, means for securing said first section to the frame of a vehicle for longitudinal adjustment with respect to the frame, opposed bevelled faces on said first and second sections, parallel arms extending from the edges of the bevelled face of one of said sections adapted to be slidably engageable with the sides extending from the face of the other of said sections, aligned apertures in said arms and in said other section, a removable locking pin extending through said apertures for connecting said first and second sections, notches in the said arms, laterally extending lugs mounted on the sides of said other section adapted to be engageable in said notches, means on said second section for coupling said second section to a trailer, and frictional retaining means mounted on one of said sections for engagement with said locking pin whereby said pin is resiliently held in locked position.

ERNEST E. FOBES.
RALPH P. RUTTER.

REFERENCES CITED

The following references are of record in the file of this patent:

UNITED STATES PATENTS

| Number | Name | Date |
| --- | --- | --- |
| 1,461,813 | Wood | July 17, 1923 |
| 1,761,324 | Windhurst | June 3, 1930 |
| 1,779,192 | Signer | Oct. 21, 1930 |
| 2,056,523 | Jacob | Oct. 6, 1936 |
| 2,062,788 | Jacob | Dec. 1, 1936 |
| 2,320,046 | Notar | May 25, 1943 |
| 2,408,531 | Riemann et al. | Oct. 1, 1946 |
| 2,485,743 | Koback | Oct. 25, 1949 |